(12) United States Patent
Shostak (10) Patent No.: US 8,098,806 B2
(45) Date of Patent: Jan. 17, 2012

(54) NON-USER-SPECIFIC WIRELESS COMMUNICATION SYSTEM AND METHOD

(75) Inventor: Robert E. Shostak, Portola Valley, CA (US)

(73) Assignee: Vocera Communications, Inc., San Jose, CA (US)

( * ) Notice: Subject to any disclaimer, the term of this patent is extended or adjusted under 35 U.S.C. 154(b) by 1484 days.

(21) Appl. No.: 10/652,611

(22) Filed: Aug. 28, 2003

(65) Prior Publication Data

US 2004/0127210 A1 Jul. 1, 2004

Related U.S. Application Data

(63) Continuation-in-part of application No. 10/231,720, filed on Aug. 30, 2002, now Pat. No. 6,892,083, and a continuation-in-part of application No. 09/947,235, filed on Sep. 5, 2001, now Pat. No. 6,901,255.

(60) Provisional application No. 60/407,503, filed on Aug. 30, 2002.

(51) Int. Cl.
*H04M 3/42* (2006.01)
(52) U.S. Cl. ............. 379/201.02; 713/186; 455/452.2
(58) Field of Classification Search ............ 379/201.07, 379/57–58, 104, 201.01, 201.02, 201.03; 455/452.2, 26.1; 713/186
See application file for complete search history.

(56) References Cited

U.S. PATENT DOCUMENTS

| 5,493,692 | A | 2/1996 | Theimer et al. ............. 455/26.1 |
| 5,515,426 | A * | 5/1996 | Yacenda et al. .......... 379/201.07 |
| 5,629,981 | A * | 5/1997 | Nerlikar ........................ 713/168 |
| 6,049,710 | A | 4/2000 | Nilsson ......................... 455/409 |
| 6,311,071 | B1 | 10/2001 | Voroba et al. ................. 455/550 |
| 2004/0157648 | A1* | 8/2004 | Lightman ..................... 455/566 |
| 2004/0230809 | A1* | 11/2004 | Lowensohn et al. ......... 713/186 |

OTHER PUBLICATIONS

PCT International Search Report dated Feb. 5, 2004 corresponding to PCT/US03/27281.

* cited by examiner

*Primary Examiner* — Phuoc Doan
(74) *Attorney, Agent, or Firm* — DLA Piper LLP (US)

(57) ABSTRACT

A wireless communication system has a central computer, one or more access points and personal badges that communicate with the one or more access points. The central computer includes a database indexed by either user identification codes or badge serial numbers. When a user activates a badge, the central computer assigns the badge to the user who activated the badge so that any message for the user is directed to the badge. The user may also access his personal data section in a central computer database through the badge while the activation is valid. When the user deactivates the badge, the central computer deletes the association and returns the badge to a non-user-specific state. Where docking stations are available to rest the badges not being used, the badges may be configured so that they are activated when decoupled from the docking stations and deactivated when coupled to the docking stations.

31 Claims, 9 Drawing Sheets

NON-USER-SPECIFIC WIRELESS COMMUNICATION SYSTEM AND METHOD

RELATED APPLICATION/PRIORITY CLAIM

This patent application is a continuation-in-part (CIP) and claims the benefit, under 35 USC 120 of U.S. patent application Ser. Nos. 09/947,235 now U.S. Pat. No. 6,901,255, and 10/231,720, now U.S. Pat. No. 6,892,083, filed on Sep. 5, 2001 and Aug. 30, 2002, respectively, which are herein incorporated by reference in its entirety. This patent application also claims priority, under 35 USC 119, of U.S. Provisional Patent Application Ser. No. 60/407,503 filed on Aug. 30, 2002 which is incorporated by reference in its entirety.

BACKGROUND OF THE INVENTION

This invention relates generally to a system and method for providing wireless communications between individuals and in particular to a system and method that uses lightweight wireless devices that communicate with one or more access points which in turn connect to a typical communications/computer network.

Various different wireless communication devices are well known and form a large part of our everyday lives. Examples of the well known wireless communication devices include cellular phones from various manufacturers, wireless e-mail systems, such as the Research in Motion (RIM) wireless e-mail devices that include personal information management features and capabilities, pagers and other wireless access devices, such as Palm-type handheld devices that permit e-mail or Internet access.

These well known wireless communication devices provide an expanding range of capabilities. For example, when originally introduced, cellular phones provided only wireless telephone access and the clarity of the cellular phone calls was not clear. Recently, the next generation of cellular phones were introduced (2 G handsets) that provided limited Internet access so that, for example, a user may browse the World Wide Web as one might do with a typical desktop computer. Recently, the next generation of cellular phones (2.5 G and 3 G handsets) are being introduced which allegedly will provide greater bandwidth connections that will enable the same level of functionality as is provided to a desktop computer. Thus, these devices permit the integration of telephony functions with the functions of a web browser.

However, these improvements and enhancements cannot be conveniently taken advantage of because even with the devices becoming increasingly small, most devices are too bulky and therefore difficult to carry around all the time. For example, a jogger who may be well aware that he might need or want to contact someone before he is done jogging might choose not to jog with his cellular phone because of the extra volume and weight he would have to jog with. Furthermore, people sometimes simply forget to carry or pack their wireless communication devices. For someone who stores a lot of information (e.g., telephone numbers) in his wireless device, forgetting to bring the device could cause great inconvenience.

Thus, a portable communication device that allows a user to take advantage of the functions of today's wireless communication device without the bulk or the burden of having to carry the device is desirable.

SUMMARY OF THE INVENTION

A voice-controlled wireless communications system is provided. The system may comprise a central computer system that controls the communications and a plurality of small, portable, lightweight user devices (herein referred to as a "badge") capable of being dynamically bound to a particular user. In other words, a user may activate a particular badge so that that user's personal information and messages (a user specific profile) is associated with the particular badge or even downloaded to that badge. This process is known as activation of the badge and causes the user and the particular badge to be assigned to each other. For example, activation may involve a user logging into a badge (such as by responding to a voice prompt), a user removing a badge from a docking station and logging into the badge or a user turning on the power to the badge and then logging into the badge. Then, when the user deactivates the particular badge, his user specific profile is deleted and the association between the particular badge and the user is severed so that the badge returns to a non-user specific state. This process is known as deactivation in which the association between the user and the particular badge is deleted. For example, deactivation may involve a user logging out from the system (such as via a voice command), a user turning the power off for the particular badge, or a user placing the badge into the docking station. Each badge is also capable of communicating with the central computer and other badges through one or more access points that may be connected to the central computer by a typical computer/communications network. The central computer has a database including a list of registered badge users (e.g., user identification codes) and a list of registered badges (e.g., badge serial numbers), and assigns and de-assigns the users to the badges. More specifically, when user #1 activates badge #5, the central computer assigns user #1 to badge #5 and allows a user of badge #5 to access all information in the central computer database that relates to user #1. This information in the central computer database may include personal information that user #1 stored or previous commands user #1 sent to the central computer. Thus, if user #1 previously created a buddy list of other users whose calls are to be flagged with a distinctive ring tone, this buddy list will be associated with badge #5 even if the buddy list was actually created using a different badge. When user #1 deactivates the badge, the user #1-badge #5 assignment is deleted and the badge is returned to its non-user-specific mode. The badge may then be associated with the next user who activates it.

In one embodiment, the badge may be placed in a docking station when not in use. In this embodiment, the badge may be designed so that it automatically deactivates when placed in the docking station. When the badge is decoupled from the docking station, the user may be prompted to log into the badge and the badge is activated. Upon activation, the badge may prompt the user who picks up the badge for a user identification code so that it can forward the user identification code to the central computer, which then assigns the user to the badge from which the identification code was received. This assignment and de-assignment process may be repeated as many times as needed. The badge may also be designed to automatically power off and charge up when placed in a docking station.

The non-user-specific property of the dynamic binding badge is a clear advantage over user-specific devices such as cellular phones or pagers in that it makes it unnecessary for users to always carry an appropriate communication device with them. If docking stations are placed at various locations within a building or in a city, for example, a user can pick up any badge in a convenient location and activate it to access all the information he previously stored in the central computer.

In effect, the user is able to pick up "his cellular phone" from any docking station instead of carrying a communication device with him everywhere.

DETAILED DESCRIPTION OF A PREFERRED EMBODIMENT

The invention is particularly applicable to a voice-controlled wireless communications system that uses Bluetooth or EEE 802.11 as a communications protocol and an Ethernet communications/computer network and it is in this context that the invention will be described. It will be appreciated, however, that the voice-controlled wireless communications system in accordance with the invention has greater utility since it can be implemented using various different communication protocols and various different computer networks.

Figure 1:
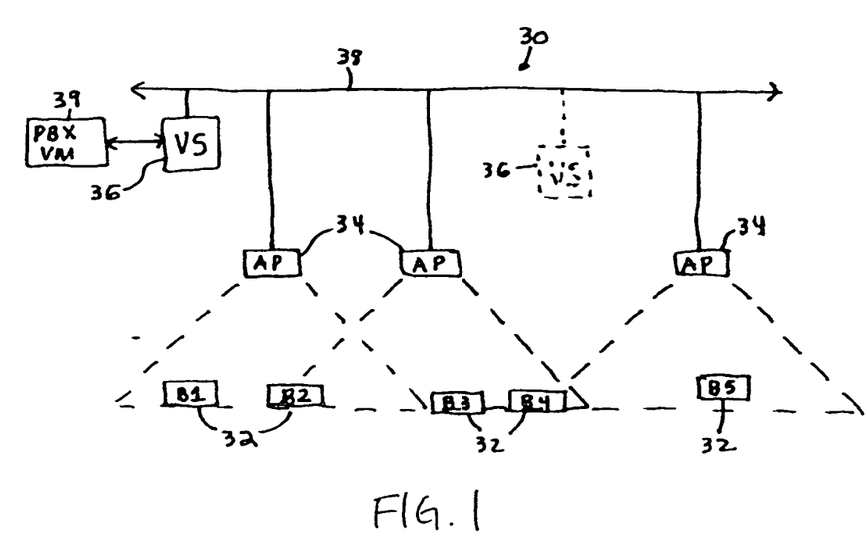
FIG. 1 depicts an example of a preferred embodiment of the voice-controlled wireless communications system in accordance with the invention.

FIG. 1 illustrates an example of a preferred embodiment of the voice-controlled wireless communications system 30 in accordance with the invention. In particular, the system comprises a plurality of wireless user badges (B1-B6 in this example) 32, one or more wireless access points (AP) 34 and one or more central computers (VS) 36, such as a server computer, as shown. In this figure, a local area network wireless communications system is shown that permits communication between badges in the same building wherein the access points 34 and the central computer 36 are connected to each other and communicate with each other over a communications/computer network 38 which may be a local area Ethernet network. The voice-controlled wireless communications system, however, is not limited to being implemented using a LAN since it may also be implemented using any other type of computer network. For example, for a large company with multiple buildings, a company wide voice-controlled wireless communications system may be provided wherein the building may be interconnected using a wide area network (WAN), there may be a central computer 36 located at each building which communicates with other central computers over the WAN, and each building may have a LAN with a central computer 36, one or more access points 34 and a plurality of badges 32. In a preferred embodiment, the computer network may be an Ethernet based network, the central computer 36 may be a typical server computer with additional features described below, each access point 34 may be a wireless access point that uses a particular wireless protocol, such as Bluetooth or the EEE 802.11 standard and the wireless badges 32 are capable of communicating with the access points using the particular protocol. Thus, if the access points are implemented using the Bluetooth protocol, then the badges will have Bluetooth transceivers or if the access points are implemented using the IEEE 802.11 standard, then the badges will have 802.11 compliant transceivers.

Returning to the system shown in FIG. 1, a voice-controlled wireless communications system is shown that has a primary central computer 36 and a backup central computer (shown in phantom) that are both connected to the computer network 38. Each central computer 36 may also be connected to a telephone system 39, such as the public branch exchange system (PBX) and voicemail (VM) system shown, that permits the server to set up, manage and take down communications sessions between a user of the system that has a badge and a third party. Each access point 34 is also connected to the computer network 38 and communicates with the central computers 36 over the computer network. The access points 34 each have a limited range of operation/coverage 40, known as a network neighborhood, as shown. To permit handoff between access points as a person with a badge moves between different network neighborhoods, the network neighborhoods may preferably overlap to permit handoff without dropping a communications session. The access points may communicate with each badge 32 using a wireless protocol, such as Bluetooth or the IEEE 802.11 standard. In general, each access point is capable of handling some predetermined number of active badges (e.g., badges that are actively communicating with the central computer or actively engaged in a call with someone) so that more than one badge may be needed in a particular high density area with multiple badges. Each badge 32 is a small, lightweight, voice-controlled, wireless device that is capable of communicating with an access point. Each badge is preferably powered by a rechargeable battery. In general, each badge is an access device to the voice-controlled wireless communications system, but does not perform much of the actual processing since the processing power of each badge is relatively small. Thus, each badge will communicate with the central computer 36 through an adjacent access point in order to implement the desired wireless communication functions that are described in more detail below.

Figure 2:
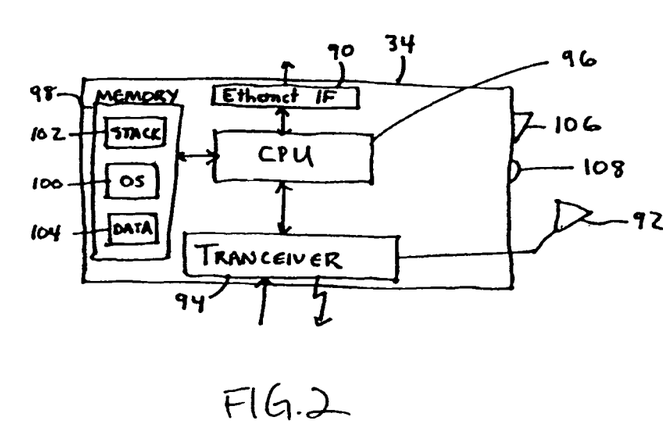
FIG. 2 depicts a block diagram of an exemplary access point in accordance with the invention.

FIG. 2 is a block diagram of an exemplary access point 34 in accordance with the invention. As described above, the wireless system 30 may include at least one and typically several access point units situated at various locations within the customer premises so that the network neighborhoods of the access points preferably overlap. Each access point 34 is connected to the computer network 38 (see FIG. 1) by a computer network interface 90. Depending on the installation, the access point may be plugged into as standard RJ45 Ethernet jack (intended typically for workstation nodes) using the Ethernet interface as shown in FIG. 2 and it may be mounted on the wall. Alternatively, the access point may be located within the area above a drop-down tiled ceiling. The power for the access point may be provided by the network cable itself (according to a new standard) or the access point may be connected to a AC source.

Each access point may include an external antennae 92 which may be supplied in several different variations, depending on the requirements of the particular installation. For example, the antenna may have directional gain and may be mounted outside the building and connected to the access point via a feed-through through a window for an outside access point. Alternatively, the antennae may be mounted adjacent to the access point inside of a building area.

In principle, each access point serves a predetermined radius. The actual radius depends on the type of wireless technology being used. For example, for a Bluetooth wireless technology, a radius of approximately 35 meters of coverage indoors and 100 meters out-of-doors may be typical. Each such area of coverage is said to be a cell. As described above, access point spacing must be such that there is sufficient cell overlap that hand-off of badges from one access point to the next can be accommodated. The spacing of access points is also a function of the anticipated conversation density. In particular, each access point is typically able to manage up to seven active badges (i.e., seven concurrent active connections). In situations where a greater number of active connections are likely within a given area, cell size can be reduced (and the number of access points increased).

Each access point further comprises a wireless transceiver 94 connected to the antennae that communicates with the badges. In one embodiment, the transceiver may be a Bluetooth transceiver while in a preferred embodiment, the transceiver may be a radio transceiver that implements the EEE 802.11 standard. The access point may further include a central processing unit (CPU) 96 that control the transceiver and the computer network interface 90. In a preferred embodiment, the CPU may be a 32-bit RISC processor. The access point may further include memory 98 (which may include both memory chip devices as well as persistent storage devices) that stores the instructions and software used by the CPU 96 to control the operation of the access point. For example, the memory may include an operating system 100, an Ethernet-based TCP/IP stack 102 and data 104 associated with the operation of the access point. For example, the access point may temporarily buffer the voice data from a badge prior to communicating it to the central computer over the computer network. The access point may also include a control switch 106, such as an on/off switch and a status indicator 108, such as a pilot LED.

As is well known, each access point is factory-assigned a unique network medium access control (MAC) address and can be assigned an IP address either through a dynamic host configuration protocol (DHCP) or through wireless programming using special wireless communication system installation tools (e.g., possibly a badge with special firmware). Now, the central computer (a server in the preferred embodiment) will be described in more detail.

Figure 3:
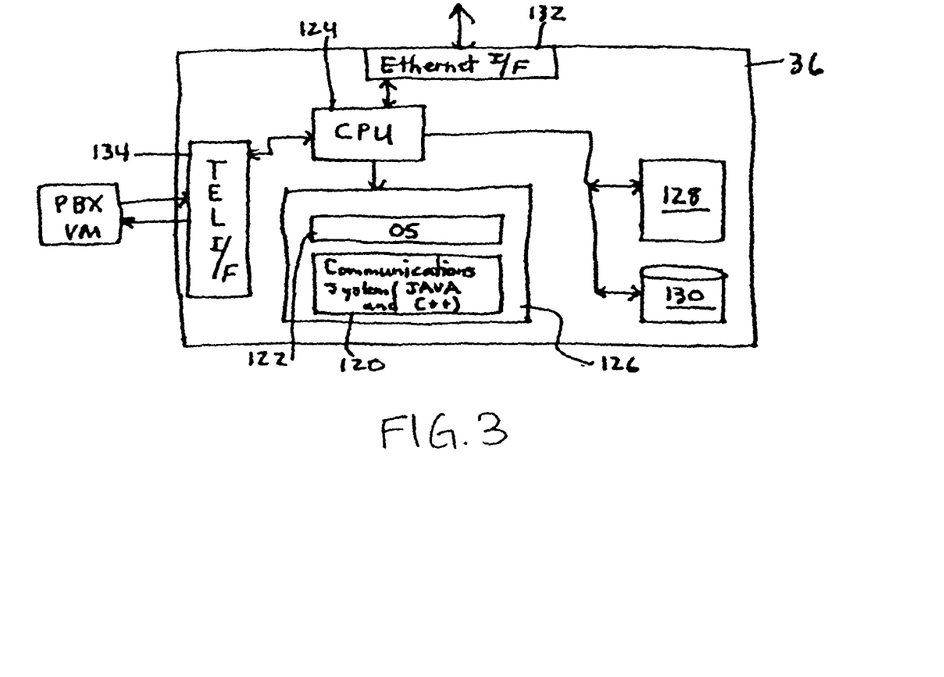
FIG. 3 depicts a block diagram of an exemplary server in accordance with the invention.

FIG. 3 is a block diagram of an exemplary central computer 36 in accordance with the invention. The central computer 36 is responsible for the overall control of the system. The server consists of a set of Java and C++ application programs 120 running on an Windows-based operating system 122 on Windows NT or Windows 2000 platforms, together with special-purpose hardware needed for telephony integration. In more detail, the central computer 36 may include a central processing unit (CPU) 124 and a memory 126 that stores software currently being executed by the CPU such as the operating system 122 and the JAVA and C++ applications 120 that implement the wireless communication functions of the wireless communications system. The server further comprises a persistent storage device 128, such as a hard disk drive, an optical drive, a flash memory or the like and a database 130 that stores information associated with the wireless communications system. The database stores user information, including the assignment of users to badges, speech files containing user name prompts and voice signatures, user preferences and buddy lists. It also keeps track of the whereabouts of users as they roam within the communications network. In large corporate installations, this component may interface to global employee databases maintained by the customer.

Some information fields in database 130 may include but are not limited to the following: user name, login name, password, alternative name/identifier, phone number and address, voicemail greeting message, ring tone, caller identifier status (on/off), buddy list, block list of calls to block, message forwarding service status (on/off and if on, to what number), distribution groups (e.g., "Memory Marketing team"), saved messages, and badge serial number.

The central computer 36 may further include a computer network interface 132, such as the Ethernet Interface shown, that permits the central computer to be connected to the computer network and a telephone network interface 134 that permits the central computer to be integrated with a typical telephone system that may include, for example, a public exchange telephone system and a voicemail system. The central computer typically resides in the same location as the customer's telephone equipment so that it can interface to the PBX and the voicemail system.

Figure 4:
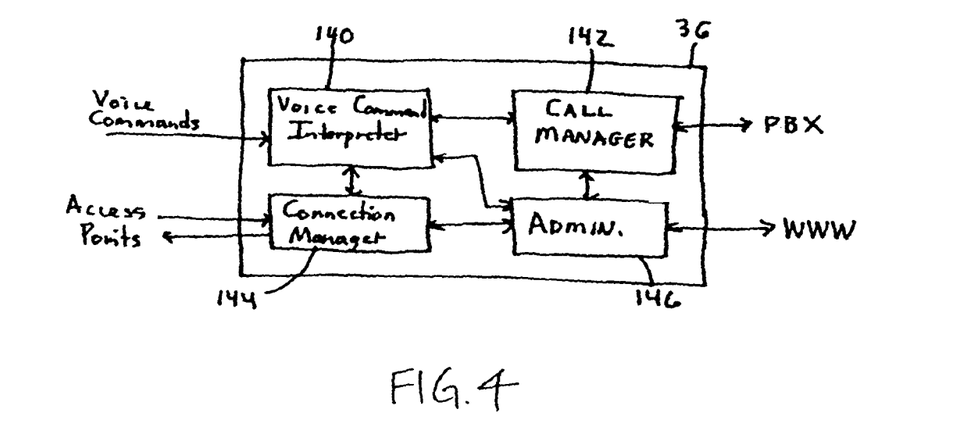
FIG. 4 depicts more details of the server shown in FIG. 3.

FIG. 4 illustrates more details of the central computer 36 shown in FIG. 3. In particular, the functional blocks of the software 120 are shown in more detail. The software may include a voice command interpreter 140, a call manager 142, a connection manager 144 and an administrator 146. The voice command interpreter 140 may be a component that includes a speech engine, such as the commercially available Nuance speech engine, is built onto the speech engine and has responsibility for interpreting and executing voice-based commands from both badges and externally initiated calls coming in from the public switched telephone network (PSTN). The call manager 142 has responsibility for the set-up and the breakdown of two-party and multi-party calls and maintaining status information associated with these calls and it connected to the PSTN or PBX. The connection manager 144 is the component that is responsible for managing access points and the connections between badges and access points so it is connected to the access points. It is also supports hands-off from one access point to another as a badge roams about the network. The administrator module 146 supports administrator-level and user-level configuration and monitoring of the system through a web browser interface as shown. The telephony integration component may include hardware and software needed for the system to interoperate with the phone network. The hardware typically consists of one or more Dialogic or similar cards installed within the server machine, which might interface to a TI trunk at the company PBX. The software will support an IVR interface that permits calls originating from the outside to be routed to the appropriate user.

Figure 5A:
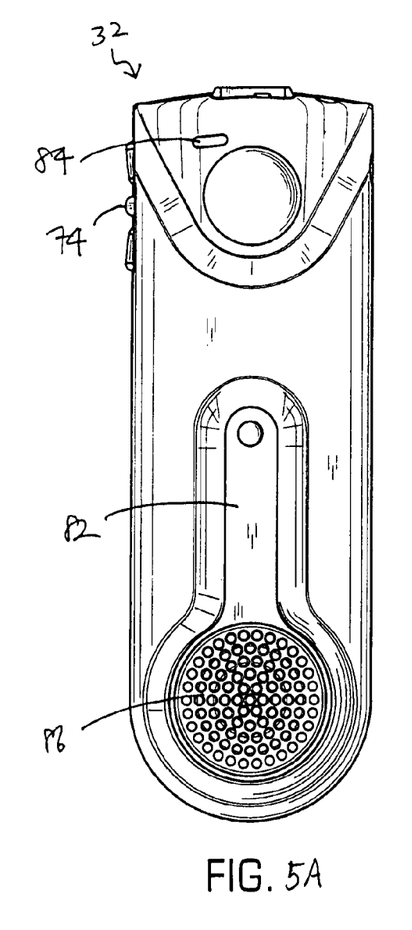
FIGS. 5A-5H depict a first embodiment of the badge in accordance with the invention.
Figure 5B:
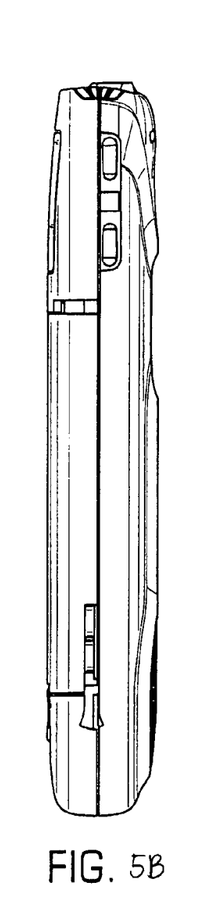
Figure 5C:
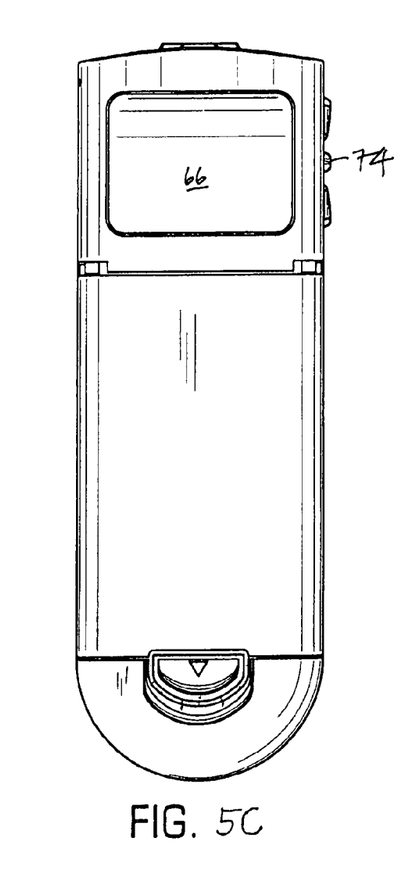
Figure 5D:
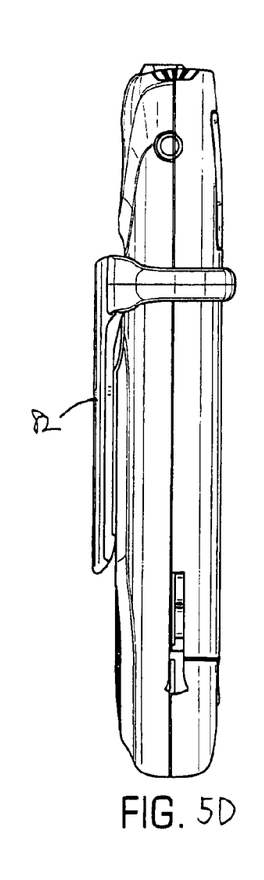
Figure 5E:
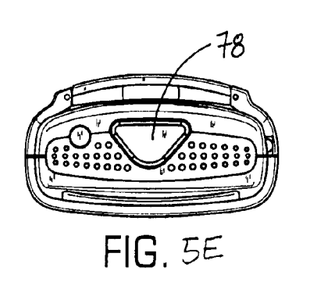
Figure 5F:
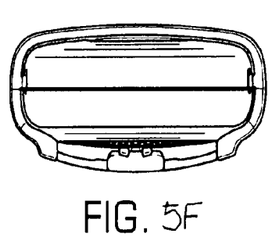
Figure 5G:
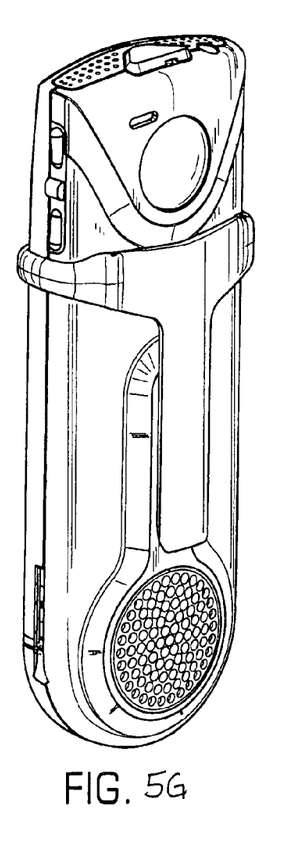
Figure 5H:
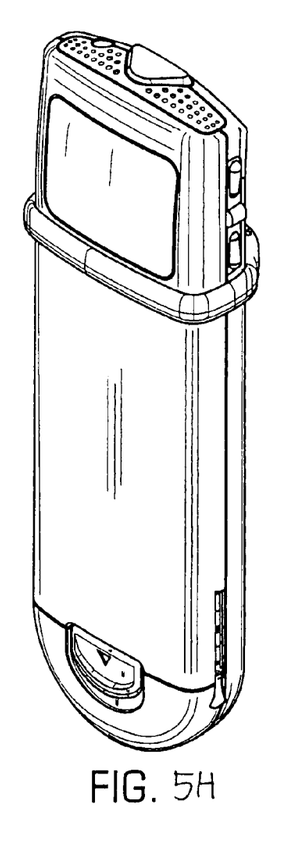
Figure 5I:
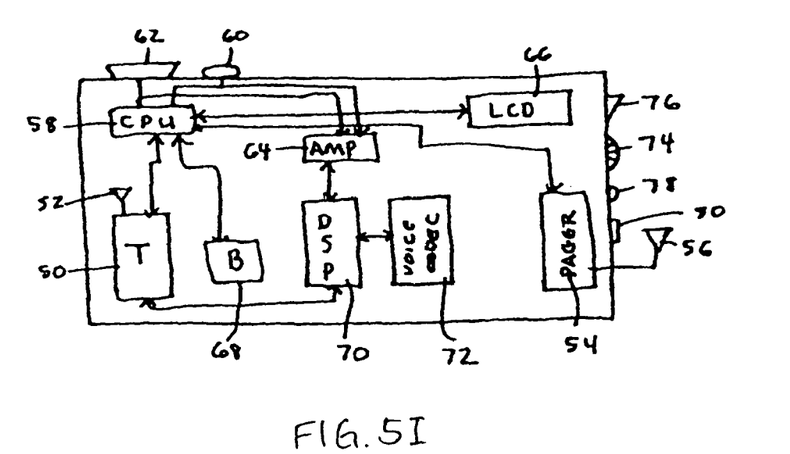
FIG. 5I depicts a block diagram illustrating the hardware components of the badge in accordance with the invention.

FIGS. 5A-5H illustrate a preferred embodiment of the communications badge 32 in accordance with the invention and FIG. 5I is a block diagram illustrating the hardware components of the communications badge in accordance with the invention. Before describing the details of the badge or the different embodiments, a general overview of the badge and its operation will be provided. Each badge is a portable, battery-powered, lightweight, wireless device that serves as the primary communications endpoints of the system. The badges support hands-free, near full duplex voice communications using a small microphone (situated near the top of the badge as described below) and a speaker (located near the bottom of the badge as described below). In addition to the wireless communications, each badge is preferably capable of receiving text pages (using a pager receiver as described below) and may include a display unit (as described below) to, among other things, permit reading of the text pages.

Each badge is only capable of voice communications when it is within the network neighborhood of any access point. The typical range of a wireless access point is approximately 35 meters for an indoor access point and approximately 100 meters for an outdoor access point. Thus, when the badge is not within the range of any access point, voice commands do not work. However, the badge may still be used as a one-way text pager anywhere within the coverage area of a global pager service network.

The badges are sufficiently small and lightweight enough so that the badge may be clipped onto a shirt pocket of the user, may be worn on a lanyard around the neck of a user or carried is a holster similar to cellular phone. In a typical environment with typical noise levels, hands-free operation using voice commands requires the badge to be situated approximately 0.5 meters from the mouth of the user so that the voice commands may be understood by the central computer. Thus, if the badge is carried in a holster, it may need to be removed from the holster and brought closer to the user's mouth for voice command, hands-free operation. For a semi-private conversation or operation in a loud environment with high noise levels, the badge may be inverted (so that the speaker is near the user's ear and the microphone is near the user's mouth) similar to a typical telephone. Optionally, a headphone jack may be provided on the badge. The badge may also include a clip (as described below) that may be used to clip the badge onto a shirt or shirt pocket or may be used to hold a corporate security badge.

Returning to FIGS. 5A-5H, the embodiment shown includes the display device 66, a clip 82, a microphone opening 84 and a speaker opening 86. Each embodiment also includes the input device 74, the on/off switch 76, the status indicator 78 and the headset jack 80 as shown. The status indicators 78 may be a series of LED lights. As shown in these two embodiments, the exact location of the various components on the badge may be varied without departing from the scope of the invention. The badge 32 may also include a display device 66, such as a liquid crystal display (LCD), that may be used for various purposes, such as reviewing text messages and pagers received by the pager receiver, to permit the user to control the operation of the badge and its configuration using a control menu or to announce the origin of an incoming call.

The badge 32 may further include an input device 74 that permits the user to control the operation of the badge and its configuration. The badge may also include an on/off switch 76 and a status indicator 78. In a preferred embodiment, the status indicator may include an LED that is capable of displaying one or more different colors to signal the operational status of the badge. The badge may further optionally include a headset jack 80 that enables the user to plug in an external microphone/speaker headset, such as an ear bud. When the external headset is plugged into the jack 80, the operation of the internal microphone and speaker is inhibited. The badges may be powered by a renewable energy source, such as a replaceable, rechargeable lithium polymer battery, that attaches to the back of the badge.

FIG. 5I shows a block diagram of the badge 32. Each badge may include a wireless transceiver 50 and a antennae 52 (that may be a 100 mw Bluetooth radio transceiver, an appropriate strength IEEE 802.11 transceiver or any other wireless transceiver) that is used for wireless communications with the access points 34 or with other badges as described below. Each badge may further include a pager receiver 54 and an internal antennae 56 (such as a Motorola FLEX pager receiver and antennae) that operates to receive text messages/pages within the coverage of any global paging service network. The antennae for the wireless transceiver, in a preferred embodiment, may be built into the clip of the badge. Each badge is assigned a unique wireless device address (so that it can be identified by each access point and the central computer) as well as a unique pager address, such as a FLEX pager CAP code.

Also, the badge may include a renewable energy source 68, such as a removable, rechargeable batter as shown, that may include protection and charge management circuitry as is well known to prevent over-charging. The badge may further comprise a digital signal processor (DSP) 70 and an audio code 72 for processing incoming speech from the microphone and for generating the voice signals generated by the speaker.

Each badge may further include a central processing unit (CPU) 58 that controls the operation of the badge and each of its components including the wireless transceiver 50 and the pager receiver 54 as shown. For example, the CPU may also control a microphone 60 and a speaker 62 that are components of the badge and permit the user of the badge to communicate with the central computer 36 using voice commands and receive voice responses from the central computer 36. The microphone and speaker may also be used for voice communications with other badge users or third parties. The badge may further include an amplifier 64 that amplifies the signals provided to/from the microphone and speaker. Further details on badge 32 are provided in U.S. patent Ser. Nos. 09/947,235 and 10/231,720, which are incorporated herein by reference.

Figure 6:
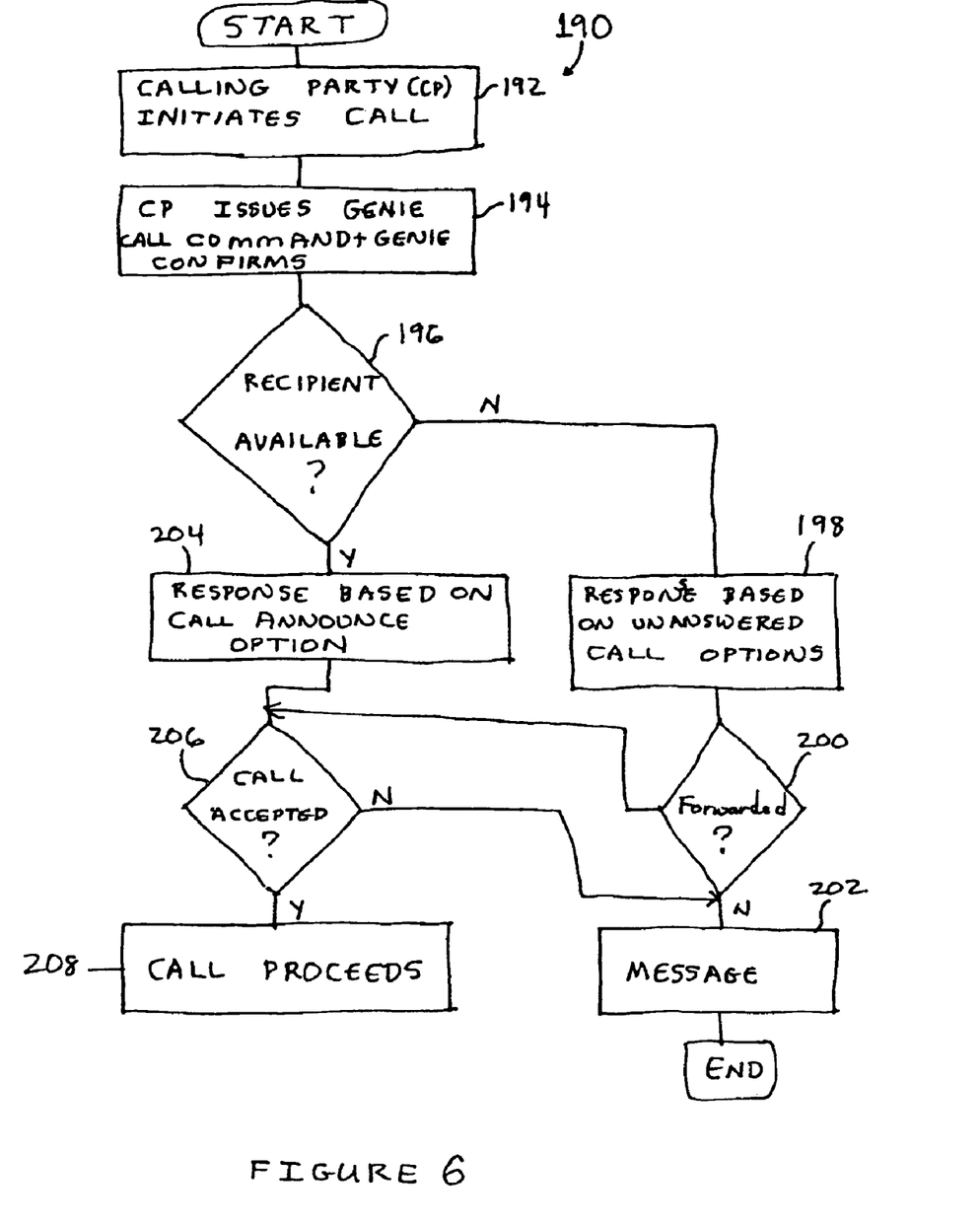
FIG. 6 depicts a flowchart illustrating a method for performing a badge-to-badge communication in accordance with the invention.

FIG. 6 is a flowchart illustrating a badge-to-badge communication process 190 in accordance with the invention. In stage 192, the calling party (user x) initiates the call by pressing the activate button to summon the central computer "Genie." Upon hearing the Genie prompt, she issues a command in stage 194, such as, "Call John Smith", or "Get me John Smith", where John Smith is the spoken name of the called party. If John Smith is on the caller's buddy list, John's nickname can be used instead: "Get Jack". The Genie confirms the command by replying, "Finding John Smith . . . " wherein the "John Smith" part is played in John's own voice. If the server incorrectly recognizes John's name ("Finding Joan Smith . . . "), user x can simply say, "Cancel" and reissue the Call command.

In stage 196, the central computer 36 (using the user database) determines if the recipient is available. If the recipient is not available (e.g., If John is outside the network neighborhood or is currently blocking calls from user x), the response in stage 198 depends on the setting of John's Unanswered Call options. If John has specified a forwarding method (as shown in step 200), the call is automatically routed using that method; if John has specified one of the message recording options, user x is asked whether she wants to leave a message (in stage 202). Otherwise, user x is told that John is unavailable but will be immediately notified of her call. The transaction ends, and the user's badge is automatically deactivated.

Returning to stage 196, assuming that John is currently available, and that calls from user x are not blocked, John's badge signals an incoming call in the manner determined by his Call Announcement Method setting in stage 204. If John has set the Auto Answer option, the call is put through immediately. Otherwise, he accepts or rejects the call either verbally (e.g., "Accept"), or using the activate button (press to accept, press and hold to reject). John can also reject implicitly simply by doing nothing. Finally, he may decide to reject, but send a message back to Mary ("Tell Mary . . ."). If the call is accepted in stage 206, the conversation between user x and John begins in stage 208 and the Genie drops out of the loop. If either party needs Genie services during the conversation, the Genie can be hailed by pressing the activate button as described earlier. Either user x or John can terminate the call by pressing and holding the activate button, causing both badges to be deactivated. If the call is rejected, John's badge automatically deactivates. If John used the "Tell" command to leave user x a message, that message in stage 202 is played back to user x. What happens next on the user's side depends on the setting of John's Unanswered Call options, as described above.

The bearer of a badge must typically first be registered with the system (or be registered by the administrator) before the badge can be assigned to him. In cases where visitors may be provided with a badge to be used temporarily, it may be useful for the administrator to register a few "Guest" users (the registration process only takes a moment) and assign guest badges to them. If desired, the spoken name of the guest can be entered through the user console, so that other users can hail him by name as opposed to, say, "Guest Three". As noted above, the assignment process entails that the user speak his own name so that he may be recognized by the system. The name will be recorded by the system and used for constructing a confirmation prompt when other parties call ("Finding . . . John Smith"). If the spoken name of the user is later changed in the User Console, the user will be prompted to re-speak the name the next time his badge is successfully activated. The user is similarly prompted to speak the identifying phrase ("John Smith in Sales") if one is provided.

The wireless system must know which badge each user is wearing so that calls to the user can be properly routed. The process of associating a badge with a particular user is herein referred to as "badge assignment." The badge assignment may occur when a badge is first activated. During activation, the system may prompt the user to identify himself, verbally or by using input device 74. Depending on the installation, it may also be necessary for the user to say a password provided to him by the administrator. Assuming the user is known to the system (e.g., registered with the system), the system will recognize the name, and will then (after a confirmation) assign the badge to the user. Once assigned, the serial number of the badge will show up on the user's console, and the badge can display a welcome greeting, when turned on, that is personalized to the user (e.g., "Hello, John"). A given badge can be assigned to at most one user at a time, and each user can be assigned only one badge at a time.

In operation, a user who wants to initiate a wireless communications function may activate his/her badge in some manner (e.g., log into the system and badge, turns on the badge and logs into the badge or removing the badge and logging into the system). The activation process causes an adjacent access point (where the badge is within the network neighborhood of the access point) to establish a communications session with the particular badge. The user is notified that activation is complete and then speaks his command which is received by the badge using its microphone and converted into digital data. The base may then communicate the digital command data to the access point which in turn sends the digital command data to the central computer 36 over the computer network. The server may then analyze the digital command data in order to determine the command issued by the user, such as "Where is Paul Barsley". If the central computer 36 is able to properly identify the command, then it will execute the appropriate instructions to perform the commanded operation. If the central computer cannot properly interpret the command, it may request the user to try the command again. In this manner, the user is able, using only his voice, to perform various wireless communication functions wherein the central computer implements most of the functions.

As previously mentioned, a badge can be assigned to only one user at a time. However, a badge can later be reassigned to another user. For example, a current user may assign his badge to another user via a voice command. Alternatively, the system administrator can explicitly set the serial number of the badge to be assigned to a user through the user console.

In more detail, system 30 may be configured so that a badge 32 is associated with different users at different times. Badge 32 may be "personalized" for a first user when activated by the first user and be returned to its non-user-specific mode upon deactivation. When a second user activates the same badge 32, badge 32 may be "personalized" for the second user and central computer 36 so that database 130 (see FIG. 3) may assign the second user to the badge he activated. Once the second user is assigned to the badge, central computer 36 associates all the information relating to the second user such as speech files containing user name prompts, voice signatures, user preferences, and buddy lists, with the badge that the user activated. Central computer 36 may also keep track of the whereabouts of the particular user based on the location of the badge.

In some embodiments, the badge may be designed to rest in a docking station when not being carried or used by a user. In these embodiments, a badge may be configured to be automatically activated when it is picked up from the docking station and automatically deactivated when it is returned to the docking station. Such automatic activation-deactivation may be useful in an office building as an alternative to a paging system, and may be implemented by placement of docking stations at certain locations within the office building. A user who picks up the badge may activate the badge by punching in or speaking an identification code that identifies him to the central computer 36. Upon activation, the central computer 36 associates all user information data for the particular user with the serial number of the badge he picked up. While the assigned user is using the badge, any changes the user makes (e.g., a new name, a block request) in the user database is used to update database 130 by central computer 36. In some embodiments, the newly input changes may be stored in the badge's local memory and uploaded to database 130 upon deactivation. When the user returns the badge to the docking station, the association between the user and the badge may be cleared so that the badge is returned to its non-user-specific state, ready to be associated with the next user who activates it.

Figure 7:
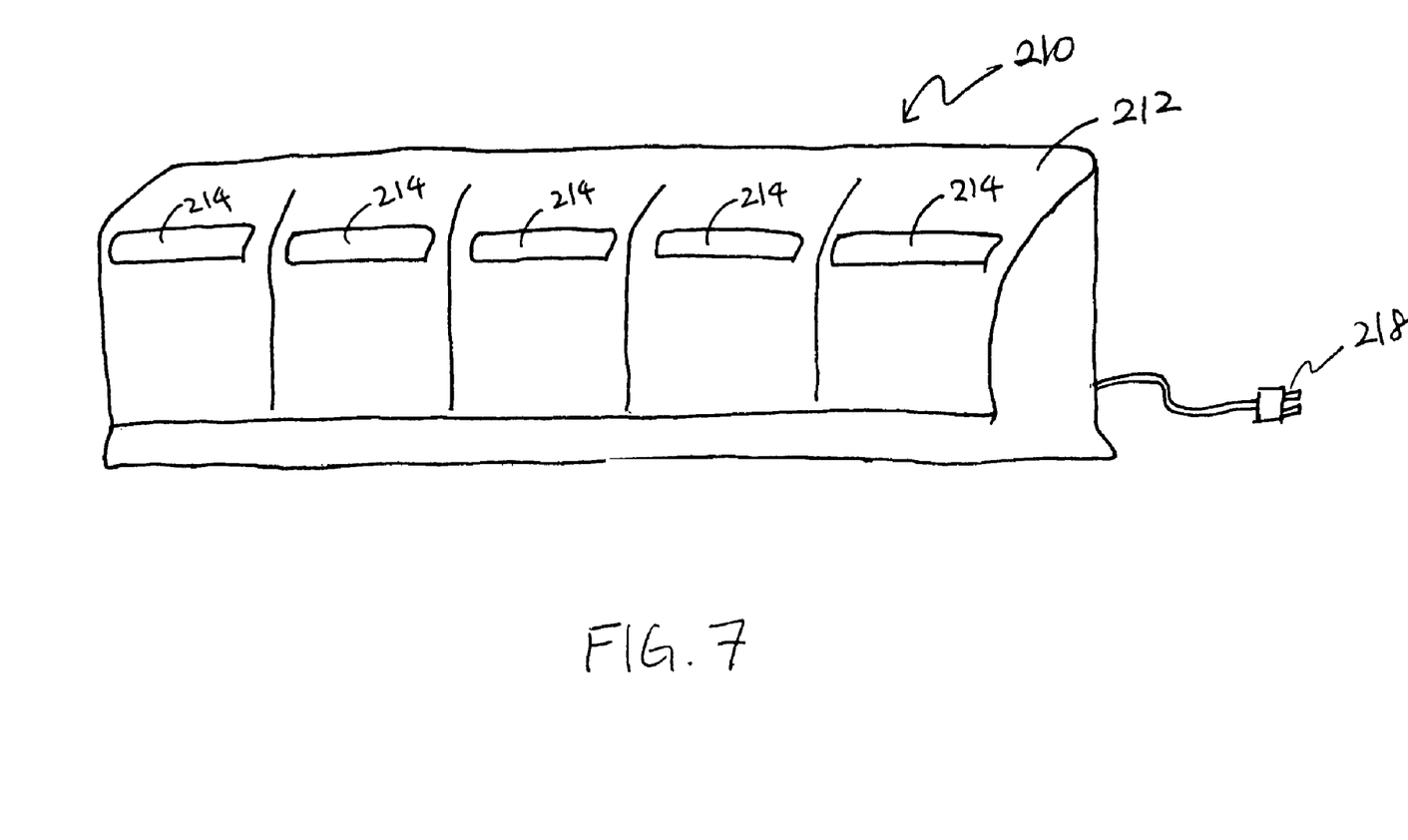
FIG. 7 depicts a docking station that may be used to rest a badge when the badge is not being used, in accordance with the invention.

FIG. 7 depicts a docking station 210 that may be used to "dock" a badge 32 of the type shown in FIGS. 5A-5H. Docking station 210 includes a housing 212 with a plurality of cavities 214 into which the badge 32 can be inserted. Once the badge is inserted, there is at least one electrical contact inside each of the cavities 214 that, when coupled with an electrical contact on the badge 32, indicates to the badge 32 that the badge 32 is docked. When the badge 32 is docked, the badge 32 sends signals to central computer 36 so that central computer 36 erases the association between the particular badge 32 that has been docked and a user-specific data section, thereby returning badge 32 to a non-user-specific state. When a user picks up the badge 32 so that the electrical contact on the badge 32 and the electrical contact in one of the cavities 214 are de-coupled, the badge 32 sends signals to central computer 36 so that a badge 32 prompts a user for a user identification number. The docking station 210 may also be a charger. Therefore, docking station 210 may be coupled to a power source, for example with an electrical contact 218. Although the particular figure shows a docking station with five cavities 214, the present invention is not so limited. Also, the cavities 214 may be interchangeable so that any badge can be docked in one of the cavities 214.

Figure 8:
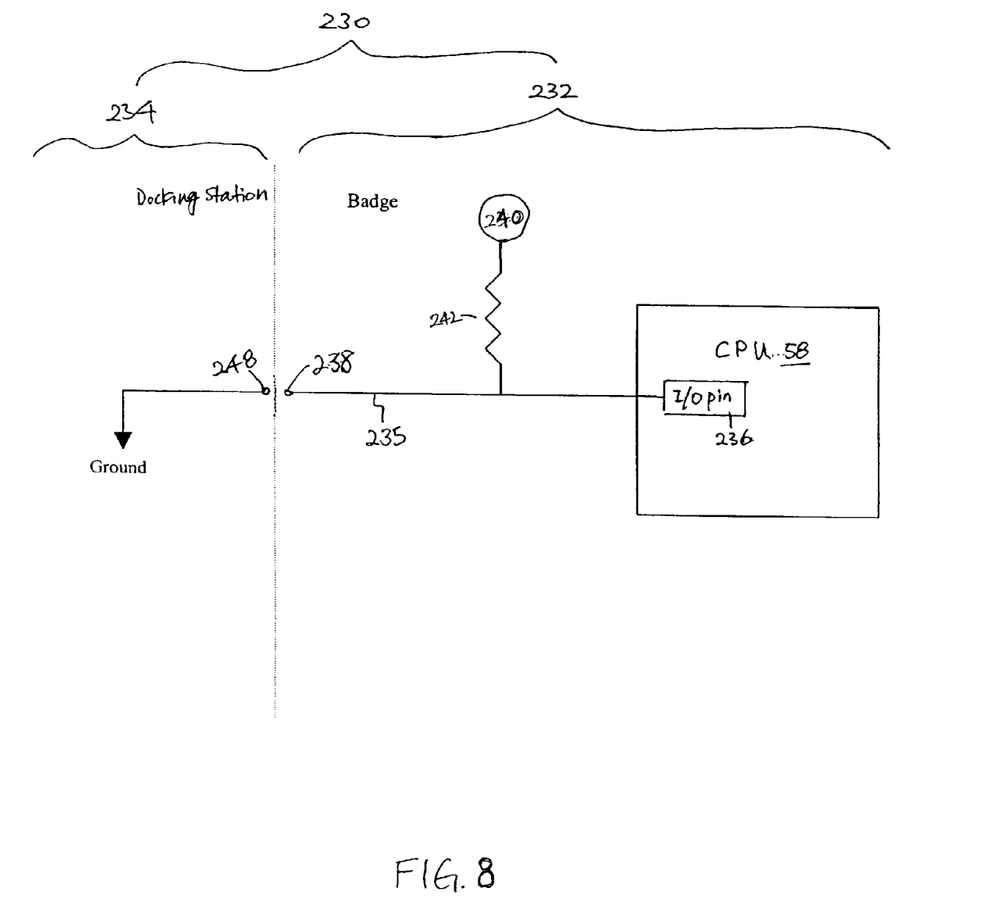
FIG. 8 depicts a switch that may be used to implement the automatic log-off and power-off function of the badge, in accordance with the invention.

A docking station may also act as a charger for the badge. If the docking stations are placed in clusters, such as in a "gang" charger, the radio frequency emission from each device could interfere with the operation of other devices. In order to reduce or eliminate this undesirable interference, the badge may be configured to log out the user and power off when placed in the docking station. The automatic log-out function may be implemented by a software. The automatic power-off function may be implemented mechanically, for example with a switch that is located to be pressed when the badge is placed in a docking station, or by circuitry, as shown in FIG. 8. Optionally, the badge may be configured to power-on when the badge is separated from the docking station. This automatic power-on function may be implemented by the same switch that is used to implement the automatic power-off function. Upon being powered on, the badge may prompt the user to provide a user identity so that the user can log on.

In an alternative to the docking station embodiment, the badge may be deactivated (which erases the association (binding) between the user and the current badge) by powering off the badge. The powering off of the badge by the user will also result in the association between the user and the current badge being erased so that the badge returns to its non-user specific state. Thus, the powering off of the badge by the user may result in the same auto-logout process as when the badge is placed into the docking station. When the user turns the badge back on, the user must then re-establish his association with the badge as set forth above.

FIG. 8 depicts an example of a circuitry 230 that may be used to implement an automatic power-on and power-off switch. The circuitry 230 includes a badge circuitry 232 that resides in a badge and a docking station circuitry 234 that resides with the docking station. The badge circuitry 232 includes a circuit 235, one end of which is connected to an I/O pin 236 of CPU 58 (see FIG. 5I) and the other end of which is a node 238. The circuit 235 is coupled to a voltage source 240 through a resistor 242. The voltage source 240 provides a voltage that is configured to represent a "high" voltage to the I/O pin 236. Thus, when node 238 is open, I/O pin 236 senses a "high" voltage, which causes the badge to be powered on. However, when the badge is placed in the docking station, node 238 comes in contact with a node 248 of the docking station and becomes ground. Thus, when the badge is docked, the I/O pin 236 senses a "low" voltage. The CPU 58 may be programmed to log off and power off when I/O pin 236 senses a "low" voltage.

Figure 9:
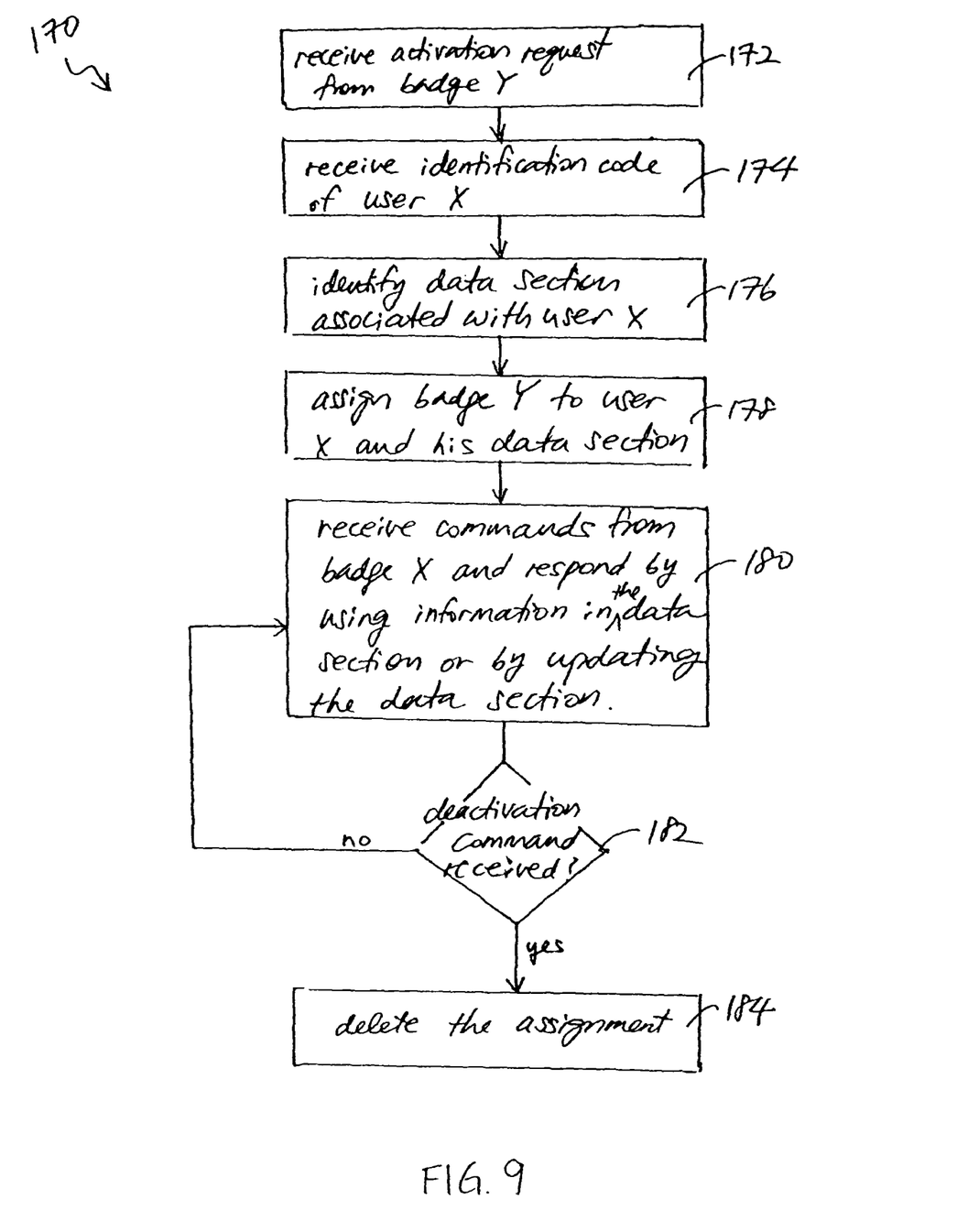
FIG. 9 is a flowchart illustrating a central computer's activities in a badge assignment-de-assignment process in accordance with the invention.
Figure 10:
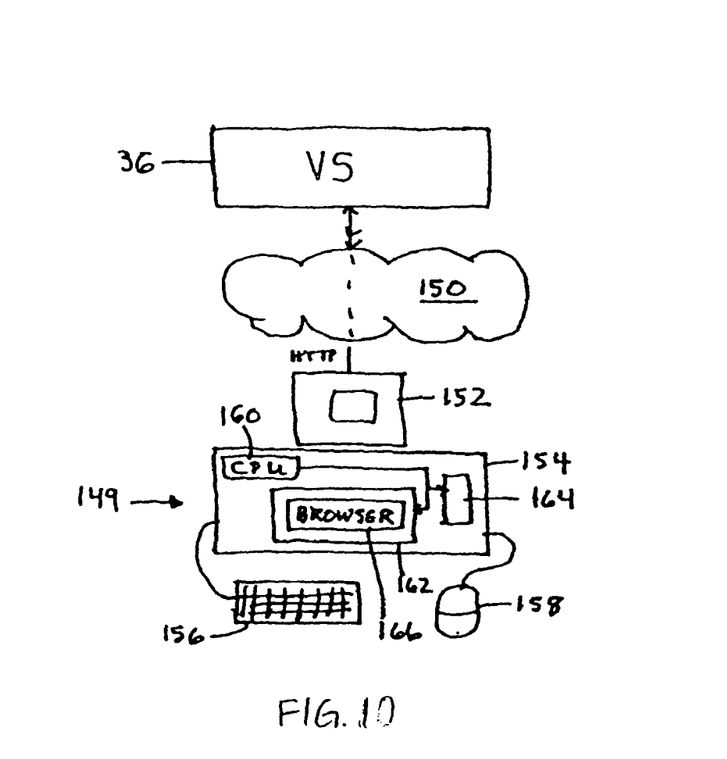
FIG. 10 depicts an example of a user/administrator console in accordance with the invention.

FIG. 9 depicts, in a flowchart, a badge assignment and de-assignment process 170 the central computer executes to enable a non-user-specific badge in accordance with the invention. The badge assignment and de-assignment process 170 begins when central computer 36 receives an activation request from user X through badge Y (stage 172). Depending on the embodiment, the activation request may be received when user X picks up badge Y from a docking station, when user X gives a verbal command, or when user X presses a button such as the on/off switch 76 (FIG. 5G). The user X then provides his identification code, perhaps in response to a prompt by the badge. The central computer 36 receives this identification code (stage 174) and identifies a data section (i.e., a section containing user profile and personal data) associated with user X based on the received identification code (stage 176). Then, the central computer 36 assigns badge Y or its serial number to user X (stage 178) so that a user can access or change user X's data section by sending commands using badge Y. In one embodiment, badge Y downloads the information in user X's data section to the local memory of badge Y. Once the assignment is made, central computer 36 receives commands from badge X and responds to the commands, using information in the data section if needed (stage 180). For example, the central computer may use user X's buddy list in response to a command to call a person. If a received command is a request to change or add information in the data section, central computer 36 does what is requested. For example, if user X changes or adds personal information, central computer 36 may update database 130 according to the new request so that user X will access the updated information next time. In some embodiments, badge Y may store the new information in a local memory and update database 130 upon deactivation.

The central computer 36 checks, perhaps at a predetermined time interval or after executing a predetermined number of commands, whether a deactivation command has been received (stage 182). If no deactivation command has been received, central computer 36 loops back to stage 180 and continues to receive commands from badge Y. On the other hand, if a deactivation command has been received, central computer 36 does not check for the next command. Instead, the central computer 36 deletes the user X-badge Y assignment by de-assigning user X from badge Y (stage 184), returning badge Y to a non-user-specific state. User X may also deactivate badge Y by pressing one or more buttons, saying a command (e.g., "deactivate now"), or by simply returning it to a docking station, depending on the embodiment.

FIG. 8 illustrates an example of a user/administrator console in accordance with the invention. In particular, the user console in accordance with the invention may be implemented when a computer 149, such as a personal computer, is used to access the central computer 36 over a computer network 150, such as the World Wide Web, that uses the typical HTTP protocol. The computer 149 may include a display unit 152, a chassis 154 and one or more input/output devices, such as a keyboard 156 and a mouse 158. In more detail, the chassis may include a central processing unit (CPU) 160, a memory 162 that stores software currently being executed by the CPU and a persistent storage device 164, such as a hard disk drive. To implement the user console functionality, a typical browser application 166 may be downloaded into the memory and executed by the CPU. The browser will permit the computer to establish a connection over a communications link, such as a DSL modem line or the like, to the central computer 36 using the HTTP protocol. To permit the user to view the system information, the server may generate one or more web pages that are displayed on the display unit of the computer and the user may interact with the web pages to change the information of the system.

The user console is a browser-accessible web application through which users are registered with the system, and through which various information fields, preferences, and buddy lists can be set up. The console also allows a user to retrieve saved text and voice messages and to view a call activity log. Users can access the console from anywhere (both inside and outside the customer establishment) via a login name and password. Depending on the system configuration, new users may either be allowed to self-register through the console, or may be registered only by the system administrator. In the latter case, the administrator might simply supply a user name and password, and let the user fill out preferences and other profile information.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A wireless communications system comprising: a central computer including a database, the database containing a plurality of data sections wherein each data section is associated with one of a list of users, the database also containing a list of badges and user-badge assignments; a plurality of badges that communicate with the central computer via a communications network wherein each badge has a microphone and is configured to be activated by a user and wherein upon activation, the user is able to use the activated badge to gain access to a data section relating to the user and to communicate voice commands to the central computer using the microphone.

2. The wireless communications system of claim 1, wherein the activation comprises the central computer's identifying the user and assigning the badge the user activated to both the user and the data section relating to the user.

3. The wireless communication system of claim 1, wherein the user is not able to use the badge to gain access to the data section upon deactivation.

4. The wireless communication system of claim 3 wherein upon deactivation, the central computer deletes a user-badge assignment between the badge and the data section relating to the user so that the badge is not assigned to any data section.

5. The wireless communication system of claim 3 wherein upon deactivation, the central computer stops communicating with the badge.

6. The wireless communication system of claim 1, wherein the activation comprises the user's providing a user identification code to the badge.

7. The wireless communication system of claim 1 further comprising a docking station for each badge, wherein the badge is decoupled from the docking station prior to activation.

8. The wireless communication system of claim 7, wherein the badge is automatically deactivated when coupled with the docking station.

9. The wireless communication system of claim 7, wherein each of the badges prompts the user for a user identification code when the user separates the badge from the docking station.

10. The wireless communication system of claim 7, wherein each of the badges has a rechargeable battery portion and the docking station charges the battery portion when the badge is placed in the docking station.

11. The wireless communication system of claim 7, wherein the badge is configured to power off when coupled with the docking station.

12. The wireless communication system of claim 1, wherein the data section relating to the user includes at least one of the user's personal information, information the user previously stored in the database, and the user's previous requests.

13. The wireless communication system of claim 1, wherein access comprises ability to obtain stored information from the data section and ability to upload information to the data section.

14. A method of wirelessly communicating with a remote computer, the method comprising: receiving from a user an activation command from a wireless device including a user identification code; forwarding the user identification code to a remote central computer in response to receiving the activation command; accessing a set of user information that the central computer selected based on the user identification code, wherein the user information is stored in the remote central computer; communicating voice commands using a microphone of the wireless device from the wireless device to the central computer when the wireless device is activated; and terminating the accessing of the set of user information and communicating the voice commands upon receiving a deactivation command.

15. The method of claim 14, wherein the set of user information includes at least one of personal information relating to a particular user, information the particular user previously stored in the central computer, and the particular user's previous commands to the central computer.

16. A method of wirelessly communicating with a plurality of remote devices, the method comprising: receiving a user identification code from a first remote device; selecting a set of user information based on the user identification code; assigning the first remote device to the selected set of user information thereby allowing a user of the first remote device to access and change the selected set of user information; communicating, using microphone of the first remote device, voice commands from the first remote device to a central computer when the first remote device is assigned; and revoking the assigning upon receiving a deactivation command from the first remote device thereby wherein after revoking the assignment, the user of the first remote device cannot access the selected set of user information or communicate voice commands to the central computer.

17. A wireless communication device comprising: a chassis designed to be held or worn by a user; a microphone; a user input device coupled to the chassis; a processor inside the chassis, the processor prompting the user for an identification code in response to an activation request; and a wireless transceiver inside the chassis, the wireless transceiver forwarding the user identification code to a remote central computer, the remote central computer assigning the wireless communication device to a set of user information selected based on the identification code so that the user can access and change the set of user information by using the user input device and communicate voice commands using the microphone with the remote central computer until a deactivation request is received.

18. The wireless communication device of claim 17 further comprising a sensor located to turn off when the device is coupled to a docking station and turn on when the device is decoupled from the docking station, wherein the sensor being turned on constitutes the activation request and the sensor being turned off constitutes the deactivation request.

19. A wireless communications system, comprising:
a wireless device having a housing;
a processor in the housing;
a microphone and speaker in the housing; and
the wireless device being in one of an assigned state and an unassigned state wherein the device permits voice commands by a user spoken into the microphone to be communicated with a remote central computer when the device is in the assigned state and wherein, when the user deactivates the wireless device, the wireless device returns to the unassigned state.

20. The system of claim 19 further comprising a central computer including a database, the database containing a plurality of data sections wherein each data section is associated with one of a list of users, the database also containing a list of wireless devices and user-wireless device assignments; and wherein, when a wireless device is assigned to a user, the user gain access to a data section relating to the user.

21. The system of claim 20, wherein the central computer assigns a wireless device to a user by identifying the user and assigning the wireless device to the user and the data section associated with the user.

22. The system of claim 20, wherein, when the wireless device is in an unassigned state, the user is not able to use the wireless device to gain access to the data section.

23. The system of claim 20 further comprising a plurality of access points coupled to the central computer and wherein the wireless device is a badge that wirelessly communicates with the access points to access the central computer.

24. The system of claim 23 further comprising a docking station for each badge, wherein the badge is decoupled from the docking station prior to activation.

25. The system of claim 24, wherein the badge is automatically deactivated when coupled with the docking station.

26. The system of claim 24, wherein each of the badges prompts the user for a user identification code when the user separates the badge from the docking station.

27. The system of claim 24, wherein each of the badges has a rechargeable battery portion and the docking station charges the battery portion when the badge is placed in the docking station.

28. The system of claim 24, wherein the badge is configured to power off when coupled with the docking station.

29. The system of claim 20, wherein, when the wireless device is deactivated, the central computer deletes a user-wireless device assignment between the wireless device and the data section relating to the user so that the wireless device is not assigned to any data section.

30. The system of claim 20, wherein when the wireless device is deactivated, the central computer stops communicating with the wireless device.

31. The wireless communication system of claim 20, wherein the data section associated with the user includes at least one of the user's personal information, information the user previously stored in the database, and the user's previous requests.

* * * * *